Patented Apr. 6, 1926.

1,579,447

UNITED STATES PATENT OFFICE.

CHARLES HOFFMAN, OF TUCKAHOE, NEW YORK, ASSIGNOR, BY MESNE ASSIGNMENTS, TO THE FLEISCHMANN COMPANY, OF NEW YORK, N. Y.

MANUFACTURE OF LEAVENED BREAD.

No Drawing.     Application filed September 15, 1923. Serial No. 662,988.

*To all whom it may concern:*

Be it known that I, CHARLES HOFFMAN, a citizen of the United States, residing at Tuckahoe, in the county of Westchester, State of New York, have invented certain new and useful Improvements in the Manufacture of Leavened Bread; and I do hereby declare the following to be a full, clear, and exact description of the invention, such as will enable others skilled in the art to which it appertains to make and use the same.

This invention relates to the manufacture of leavened bread of the kind ordinarily known as white, wheat bread, and has for its object to produce a bread not differing materially in color, texture, flavor and appearance generally, from ordinary bakers' bread of the best quality, but with a far greater nutritive value.

More particularly my invention has for its object the addition to white wheat bread without detrimental effect to the quality of the bread, of water-soluble B vitamines in such form and in such quantities that the bread alone, if eaten daily to the amount of one half pound per day, will supply all the B vitamines necessary to promote normal growth and health.

By my improved process there is also added to the bread appreciable quantities of proteins, in which ingredients ordinary white wheat bread is particularly deficient. Also, the proteins added to the bread are of a character to balance the proteins in the white flour. That is to say, the proteins of the added material are of a different composition from the proteins in the gluten of the white flour, so that the resulting loaf of bread constitutes a more complete and properly balanced loaf than can be obtained by the addition of the same quantity of proteins in the form of added gluten.

By my improved process I also add to the bread a quantity of mineral salts, thereby replacing to some extent the mineral matter removed from the wheat in the bran and other screenings.

In U. S. Letters Patent No. 1,413,525 there is described an improved leavened bread and method of making the same wherein the B vitamine deficiency is supplied by the addition to the bread of extract made from the wheat germ which is taken out of the wheat in the process of milling. The bread described in this patent is highly satisfactory in all respects, but the process of manufacture of the germ extract used to supply the B vitamines is somewhat involved, requiring a large investment for its economical operation.

By the invention of the present application I utilize the yeast plant as a source for the vitamine B material to be added to the bread, the yeast being prepared for incorporation in the bread by a simple inexpensive procedure which may be expeditiously carried out with very little apparatus.

It has heretofore been proposed to add an excess quantity of yeast to bread in order to incorporate in the bread the added nutritive value of the yeast, but such efforts have not been successful for the reason that yeast, if used in a quantity in excess of the amount required to leaven the bread, has an unfavorable action, maturing the dough too rapidly to obtain the right texture, as well as producing excessive fermentation.

I have found that if the added yeast be processed before its incorporation into the dough batch to render it substantially free from moisture, and to destroy its reproductive and fermenting activity, sufficient quantity of the yeast may be added to the dough batch to provide in the bread sufficient vitamine B for a normal diet, without unfavorably affecting the quality, flavor or texture of the bread, provided these results are accomplished in such manner that the walls of the individual yeast cells are not ruptured.

In carrying out my process to produce a yeast in this condition, I preferably take the yeast as it comes from the propagating tanks and dry it in a manner so as not to cause the rupture of the cell walls. If the space is available for the purpose, this drying may be accomplished by simple exposure to air currents suitably controlled as to temperature in shallow trays.

The resulting yeast, when sufficiently dried, has its cell walls intact, but for the most part the cells will still possess reproductive and fermenting activity, and when added to the dough batch will absorb sufficient moisture to become active in the dough. I therefore take the dried yeast from the trays before adding to the dough batch, and subject it to a pasteurizing or devitalizing action by heating it to a temperature of approximately 170° F. and maintaining that temperature for approximately one half hour, which is sufficient time to render the yeast inert in the bread, so far as its functions of fermentation and maturing of the gluten are concerned, without destroying or impairing its vitamine content.

The yeast so produced may be conveniently added to the dough batch by sifting in with the flour. By the addition of 5% of the dried yeast calculated on the weight of the flour, the vitamine B content of the loaf will be raised to a point such that the bread alone will supply all the vitamine B necessary for normal growth and health where the bread forms approximately 40% of the total diet. The addition of this quantity of dried yeast to the bread also raises the protein content of the bread and adds to the mineral salt content, particularly the calcium salts, in which ordinary white wheat bread is deficient.

Instead of air-drying the yeast and then sterilizing it to destroy the fermenting and reproductive activity, the yeast may with advantage be dried in vacuum drum dryers such as are now largely used for the drying of milk. I have found that when the yeast is dried at low sub-atmospheric pressures, the moisture will be extracted from the yeast cells without rupturing the cell walls. This is probably due to the fact that the moisture is largely extracted from the cells by suction instead of being vaporized in the cell, and bursting through the cell wall occurs when the drying is effected at atmospheric pressure and at a temperature sufficiently high to drum-dry the yeast at such pressure.

The fermenting and reproductive activities of the yeast may be destroyed during the operation of drying by maintaining the drums at a temperature sufficient for that purpose. I have found that the operation of the drums at about 130° F. and at a speed such that the material is on the drum from one to two minutes, is sufficient to destroy the activity of the yeast cells so that they remain inert in the bread dough.

If the yeast cell is ruptured during the drying or sterilizing process, the yeast cannot be satisfactorily used in the bread. The chief reason for this is that yeast cells contain certain amino-acid compounds which are liberated when the cell walls are ruptured and which have a deleterious action upon the baking properties of the flour. A loaf containing an appreciable quantity of yeast which has been dried or otherwise processed by a method which causes a rupture of the cell walls will be poorly risen and of poor texture. Moreover, the yeast with the ruptured yeast cells imparts to the loaf a bitter taste which it is impossible to counteract with other ingredients.

It is particularly essential to avoid the liberation of amino-acid compounds from the yeast cells where the bread is made up with large quantities of milk. The amino-acid compounds in the presence of milk develop disagreeable flavors and inhibit the rising of the dough to a much greater extent than when the milk content is small. When, however, the yeast is dried and prepared in accordance with my approved method, as much as 5% or more of the yeast may be added to the dough batch without in any way affecting the action on the dough or the quality of the bread. The proportion of 5% of the dried yeast calculated on the weight of the flour furnishes all the vitamin B necessary when the bread constitutes 40% of the daily diet. More or less of the dried yeast may be added as desired, but this proportion is a good practical one, for the reason that when the bread furnishes a small percentage of the total daily food supply the larger quantity of other foods consumed is more certain to include vitamin-containing ingredients necessary to make up the total vitamin B requirement. When made with milk solids and other ingredients, as described in the application of George S. Ward, Ser. No. 593,538, filed October 10, 1922, this dried yeast product may be added to the bread in lieu of the wheat germ extract described in that application to make it a complete article of diet.

To supply the same vitamin content 4 ounces of the dried yeast is the equivalent of 5 ounces of the germ extract compound. The bread formula given in that application should also be modified in other respects when the dried yeast is substituted for the germ extract to compensate for the difference in composition, as will be obvious. For instance, a certain amount of sugar should preferably be used with the dried yeast to take the place of the sugar content of the germ extract.

The improvement in the nutritive value of the bread effected by the addition of 5% of the dry yeast preparation may be determined by comparison of the following analyses:

No. 1 shows the food value of a one pound loaf of white wheat bread put out by one of the large baking companies and which may be regarded as typical.

|  | Grams. |
|---|---|
| Carbohydrates | 240 |
| Protein | 40.5 |
| Fats | 12.1 |
| Salt (NaCl) | 6.7 |
| Other mineral salts | 2.78 |

No. 2 shows the nutritive value of a loaf made by the same formula with 5% of the flour replaced with my dried yeast preparation.

|  | Grams. |
|---|---|
| Carbohydrates | 231.2 |
| Protein | 47.5 |
| Fats | 13. |
| Salt (NaCl) | 6.7 |
| Other mineral salts | 3.59 |

Ordinary bread—white, wheat bread—is practically devoid of vitamines unless made with substantial quantities of milk and is very deficient in its protein content as well as its mineral salts content. I have not attempted to indicate by actual figures the vitamin content of the yeast-containing loaf, for as yet no accepted method of measuring vitamin-content has been devised. The above analysis, however, shows that the protein and mineral salt values are greatly increased and feeding experiments conducted with the yeast-containing loaf as the sole B-vitamin-containing article of diet has demonstrated that the loaf contains sufficient B-vitamin to promote normal growth and health.

My improved dried yeast compound is particularly adapted for use in white bread in that it does not affect the color, flavor or texture of the bread to any noticeable degree. It may, however, be used with equal nutritional advantage in whole wheat bread or other forms of bread to supply the vitamin deficiency and add to the protein and mineral salt content.

I claim:

1. As an article of manufacture, a bread containing a substantial quantity of pasteurized, inactive yeast with the cell walls unruptured.

2. As an article of manufacture, a bread containing a substantial quantity of pasteurized, inactive, dried yeast with the cell walls unruptured.

3. As an article of manufacture, a bread containing yeast in the proportion of substantially 5% calculated on the weight of the flour, said yeast being inactive and with its cell walls substantially unruptured.

4. As an article of manufacture, a bread containing dried yeast in the proportion of substantially 5% calculated on the weight of the flour, said yeast being inactive and with its cell walls substantially unruptured.

5. As an article of manufacture, a leavened bread containing the usual constituents of such bread and an added amount of water soluble vitamine B in the form of yeast which is without reproductive and fermenting activity and with its cell walls unruptured.

6. As an article of manufacture, a leavened bread containing the usual constituents of such bread and an added amount of water soluble vitamine B in the form of yeast which is substantially free from moisture, without reproductive and fermenting activity and with its cell walls unruptured.

7. As an article of manufacture, a leavened bread containing the usual constituents of such bread and an added amount of water soluble vitamine B in the form of yeast, which has been dried and pasteurized without rupturing the cell walls.

8. As an article of manufacture, a leavened bread containing the usual constituents of such bread and an added amount of water soluble vitamine B in the form of yeast, which has been dried and then pasteurized at a temperature of about 170° F. without rupturing the cell walls.

9. As an article of manufacture, a bread containing a substantial quantity of sterilized, inactive yeast with the cell walls unruptured.

10. As an article of manufacture, a bread containing a substantial quantity of sterilized, inactive, dried yeast with the cell walls unruptured.

11. As an article of manufacture, a leavened bread containing the usual constituents of such bread and an added amount of water soluble vitamine B in the form of yeast, which has been dried and sterilized without rupturing the cell walls.

In testimony whereof I affix my signature.

CHARLES HOFFMAN.